(12) United States Patent
Staff

(10) Patent No.: US 7,688,210 B2
(45) Date of Patent: Mar. 30, 2010

(54) ELECTRONIC ID TAG AND CO-OPERATING ANTENNA

(75) Inventor: Finn Staff, Oslo (NO)

(73) Assignee: Trac ID Systems AS, Stavanger (NO)

( * ) Notice: Subject to any disclaimer, the term of this patent is extended or adjusted under 35 U.S.C. 154(b) by 297 days.

(21) Appl. No.: 11/665,402

(22) PCT Filed: Oct. 10, 2005

(86) PCT No.: PCT/NO2005/000373

§ 371 (c)(1),
(2), (4) Date: Sep. 14, 2007

(87) PCT Pub. No.: WO2006/041306

PCT Pub. Date: Apr. 20, 2006

(65) Prior Publication Data

US 2008/0165011 A1    Jul. 10, 2008

(30) Foreign Application Priority Data

Oct. 13, 2004 (NO) .................................. 20044356
Sep. 15, 2005 (NO) .................................. 20054257

(51) Int. Cl.
*G08B 13/14* (2006.01)
(52) U.S. Cl. .............. 340/572.8; 340/572.1; 340/572.7; 342/359
(58) Field of Classification Search .............. 340/572.1, 340/572.7, 572.8; 235/375, 435, 439; 342/359; 702/188
See application file for complete search history.

(56) References Cited

U.S. PATENT DOCUMENTS

| 3,750,167 | A | | 7/1973 | Gehman et al. |
| 4,698,631 | A | | 10/1987 | Kelly, Jr. et al. |
| 4,963,887 | A | | 10/1990 | Kawashima et al. |
| 5,202,680 | A | * | 4/1993 | Savage .................... 340/853.1 |
| 5,247,304 | A | | 9/1993 | D'Hont |
| 6,536,524 | B1 | | 3/2003 | Snider |
| 6,720,764 | B2 | * | 4/2004 | Relton et al. ................. 324/235 |
| 7,014,100 | B2 | * | 3/2006 | Zierolf ....................... 235/375 |
| 7,159,654 | B2 | * | 1/2007 | Ellison et al. .......... 166/250.01 |
| 2003/0028356 | A1 | | 2/2003 | Denny et al. |

FOREIGN PATENT DOCUMENTS

| EP | 0598528 | 5/1994 |
| EP | 1447769 | 8/2004 |
| WO | WO 0206632 | 1/2002 |
| WO | WO 03062588 | 7/2003 |

* cited by examiner

*Primary Examiner*—Toan N Pham
(74) *Attorney, Agent, or Firm*—Patents +TMS, P.C.

(57) ABSTRACT

An electronic ID tag (2) for mounting in a body (18), in which at least the identity of the body (18) is to be remotely readable, the electronic ID tag (2) including an identifiable chip (24) which is electrically connected to at least one adjacent antenna (26), the identifiable chip (24) being arranged to receive energy via the adjacent antenna (26) and by means of this energy to transmit, via the adjacent antenna (26), a signal including the identity of the electronic ID tag to a distant antenna (1), and there being arranged, between the adjacent antenna (26) and the identifiable chip (24) and between the identifiable chip (24) and a ground-plane plate (28) impedance-matched inductances (34, 40), the electronic ID tag (2) being placed, with advantage, in the box portion or pin (44) of a body (18), whereby it is protected against mechanical wear.

6 Claims, 2 Drawing Sheets

I-I

II-II

III-III

ELECTRONIC ID TAG AND CO-OPERATING ANTENNA

CROSS REFERENCE TO RELATED APPLICATIONS

This application claims benefit of PCT Application Serial Number PCT/NO2005/000373 filed on Oct. 10, 2005, Norwegian Application Serial Number 20054257 filed on Sep. 15, 2005 and Norwegian Application Serial Number 20044356 filed on Oct. 13, 2004.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A CD

Not Applicable

BACKGROUND OF THE INVENTION

1. Technical Field

This invention relates to an electronic ID tag and a co-operating antenna. More particularly, it concerns an electronic ID tag including an identifiable data chip connected to an adjacent antenna, and a co-operating distant antenna. Between the adjacent antenna and the identifiable chip, and between the identifiable chip and a ground-plane plate are arranged impedance-matched inductances. The electronic ID tag may with advantage be placed in the threaded portion of a body, typically a drill pipe. The device is particularly suitable for identifying equipment which is used during work in a borehole, for example in the recovery of petroleum. The ID tag is well suited for positioning protected in the connecting box or pin of a drill pipe.

The term adjacent is used in this connection for details which are spaced less than 30 millimeters apart, whereas the term distant denotes distances of between 30 millimeters and 2 meters.

During drilling operations, for example as it is common in connection with the recovery of petroleum, a relatively great number of pipes are used, the pipes being screwed together into a pipe string. The pipe string may also include other equipment, for example controls and valve sections. A well of this kind is normally lined with casing in order to secure the borehole.

In order to keep track of the number of pieces of equipment and their physical condition, it has turned out to be useful to monitor the service time and stresses of the individual pipes and associated equipment, and also to keep track of the number and where the individual pipe is located in the pipe string.

2. Background Art

It is known for an electronic ID tag to be placed on the pipe or equipment, which is read manually by means of matched equipment when the pipe is run into the well and when it is pulled from the well. U.S. Pat. No. 5,142,128 thus discloses an apparatus for identifying equipment related to the recovery of oil, which is also arranged to keep track of the service time of the equipment. The document describes a hand-held reading device for electronic ID tags.

Electronic ID tags of the kind concerned here, are mounted on the outside of the pipes near the connecting means of the pipes. Thereby, the ID tags can be read when passing an antenna. This positioning entails that the ID tags are subjected to wear during the moving of the pipe in the borehole and to damage from, for example, power tongs during make-up and break-out operations. It has also turned out that the attachment of the ID tags in the pipes is adversely affected by relatively large pressure variations in the well.

Equipment according to prior art exhibits drawbacks related to applicability and/or reliability, as, among other things, the range of signals from the ID tags is relatively small, the ID tags are subjected to wear and may be damaged during the assembling of the pipes.

BRIEF SUMMARY OF THE INVENTION

The invention has as its object to remedy or reduce at least one of the drawbacks of the prior art.

The object is achieved according to the invention through the features specified in the description below and in the subsequent claims.

An electronic ID tag is formed to be attached to a body, in which automatic remote reading of at least the identity of the body should be possible. The electronic ID tag includes an identifiable chip of an embodiment known in itself, which is electrically connected to at least one adjacent antenna. The identifiable chip is arranged to receive energy via the adjacent antenna, in order to transmit by means of this energy, via the adjacent antenna, a signal including the identity of the electronic ID tag to a distant co-operating antenna.

In order to improve the range of the signals from the electronic ID tag, there are arranged between the adjacent antenna and the identifiable chip, and between the identifiable chip and a ground-plane plate, impedance-matched inductances. Also in order to improve the range in varying temperatures, there is used for the adjacent antenna a material which has both a very low dielectric loss and, at the same time, a stable dielectric constant at varying temperatures, combined with a very low thermal expansion coefficient.

The identifiable chip with the adjacent antenna may with advantage, and in particular when the ID tag is placed externally on a body like a drill pipe, be encapsulated in a sleeve or cup by means of a casting substance in order to give the ID tag both protection and a wear layer. To achieve the desired effect, the dielectric constant of the casting substance is less than 5 times the dielectric constant of air.

Tests have shown that the co-operation between the impedance-matched inductances and the casting substance with the relatively low dielectric constant, combined with the properties of the adjacent antenna as described above, increases the range of the signals of the identifiable chip considerably.

Further, it has been found that the range between the adjacent and the distant antennas may be increased by the identifiable chip of the electronic ID tag being electrically connected to the corresponding body.

Typically, the energy is supplied to the identifiable chip by means of the distant antenna.

It is practical to arrange the identifiable chip and antenna of the electronic ID tag in an electrically conductive sleeve, the sleeve being arranged to be attached in a recess in the body. However, most advantageously, the identifiable chip and antenna of the electronic ID tag are arranged in a cup produced of an electrically conductive material, the cup being arranged to be attachable in the recess of the body. In certain bodies the chip can be attached directly to the surface of the body.

A further safeguard, in order that the electronic ID tag will not be damaged, is to place the ID tag in a position, in which it is protected during drilling operations. An example of such mounting is the placement of the ID tag in a box portion, in which it may be placed in the pin or sleeve part, possibly in the end surface of the pipes. For pipe lengths that are joined by means of threads, the electronic ID tag may be placed, for example, in the threaded portion of the pipe.

If the electronic ID tag is placed in the box portion of the pipe, the electronic ID tag is difficult to read as long as the pipes are screwed together. Therefore, the reading point should preferably be located in a position where the electronic ID tag is uncovered, for example at a top drive located above the pipe.

The distant antenna may therefore be placed, for example, in or at the pipe connector of the top drive.

One electronic ID tag may identify several joined pipe lengths.

The distant antenna for communication with the electronic ID tag includes, in an embodiment for reading non-rotating pipes according to the invention, at least two partial antennas placed around the expected position of the electronic ID tag. The partial antennas are arranged to communicate with the electronic ID tag, and the partial antennas are arranged in such a manner that at least one of the partial antennas communicates with the electronic ID tag no matter what direction the electronic ID tag is in relative to its respective body when it is in a reading position.

It has turned out to be practical to form each partial antenna with a transmitting antenna and a receiving antenna. Tests have shown that a division like that enables a greater reading distance between the adjacent and the distant antennas, while at the same time, one of the partial antennas will always identify an electronic ID tag when the non-rotating pipe is passing, independently of the position of the electronic ID tag relative to the partial antennas.

It has also been demonstrated that the emitted effect from the partial antennas can be increased without interfering with data that the identifiable chip returns to the receiving antenna when the partial antenna includes separate transmitting and receiving antennas. Experience has proved that such interference may occur if the same partial antenna is used both for supplying energy to the identifiable, not battery-powered chip and for receiving the signals of the chip.

When reading an ID tag in a pipe which is rotating, it is sufficient to have one transmitting antenna and one receiving antenna.

The pipe located in the top drive is rotated when it is to be connected to a pipe located below. Therefore, there is normally no need for more than one partial antenna when the antenna is placed in a preferably better protected position at or in the top drive. If necessary, the pipe located in the top drive may be rotated for the electronic ID tag to be identified.

If the electronic ID tag is located in the box portion of the pipe, and the distant antenna is placed at the top drive, the distant antenna may be placed substantially closer to the drilling centre, as the distant antenna is not run through by any large bodies. The reading reliability of the electronic ID tag is therefore significantly improved.

Positioning the electronic ID tag in the pin portion of a pipe is practical also for controlling the pipe in terms of height during make-up operations, as the electronic ID tag is located just above the sleeve part of the opposite pipe until the ID tag is moved into the sleeve part. Thereby, the electronic ID tag may be read just above the adjacent pipe, to which it is to be connected. When this reading is connected to the control system of the top drive, the reading of the ID tag will provide exact control of the vertical position of the top drive.

With advantage, the transmitting antennas are activated by a time switch which in turn may receive, by way of electronic components, its signals from the drilling operation control. The drilling operation control includes, among other things, the control of when the drill pipe string is to be moved down or up, and also how far down or up it is to be moved for, respectively, the connection and disconnection of pipes.

The receiving antennas transmit their signals including the identity of the chips to a reader module, which may in turn transmit all the identities that are registered, to a control unit. This control unit will be able to filter repeated identities registered and store the identities temporarily before they are transmitted to a supporting computer system.

For practical reasons it may be advantageous for the transmitting and receiving antennas of each partial antenna to be placed side by side, evenly spaced on a circle surrounding the expected position of the electronic ID tag.

To prevent the distant antenna from being subjected to damage or hindering other work, it is practical, when the electronic ID tag is placed on the outside of the pipe, for this antenna to be arranged below the drill floor of a drilling rig and centred around the drilling centre of the drill floor.

It may be advantageous, if there is sufficient space, to arrange the partial antennas in a possibly dividable ring. A dividable ring, compared to a whole ring, will have the advantage of being removable when the drill string or other equipment stands at the centre of the ring. The same applies for the mounting of the ring.

It may also be advantageous to place electronic equipment outside the ring, for example in a specially approved explosion-proof box. Thereby it is possible to avoid the entire ring having to be in an explosion-proof embodiment.

The signals from the electronic ID tags identifying their associated components, may with advantage be correlated with operational data, for example service time and operational stresses, with the aim of forming a survey of the service history of the individual component, in order thereby, among other things, to achieve more rational maintenance and control of the use of the individual components. It may also be practical to keep a record of data concerning the geometries of subsequent components in a pipe string, so that the location of the component concerned, in a well for example, may be determined.

An object may be provided with more than one electronic ID tag.

BRIEF DESCRIPTION OF THE SEVERAL VIEWS OF THE DRAWINGS

In what follows, is described a non-limiting example of a preferred embodiment which is visualized in the accompanying drawings, in which.

DETAILED DESCRIPTION OF THE INVENTION

Figure 1:
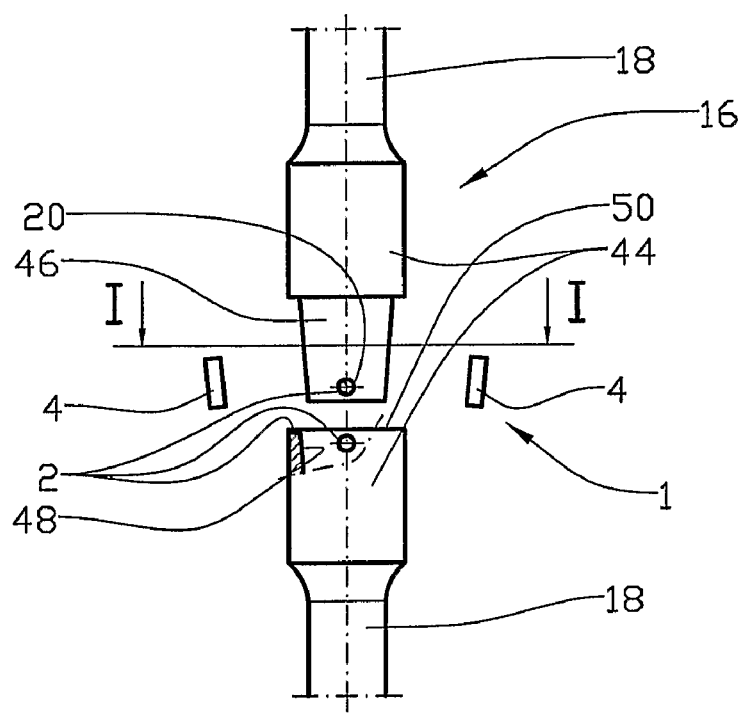
FIG. 1 shows in a simplified manner, partially in section, box portions of two pipes which can be joined, an electronic ID tag being arranged in the threaded pin of one pipe, alternative mounting positions being shown as well.
Figure 2:
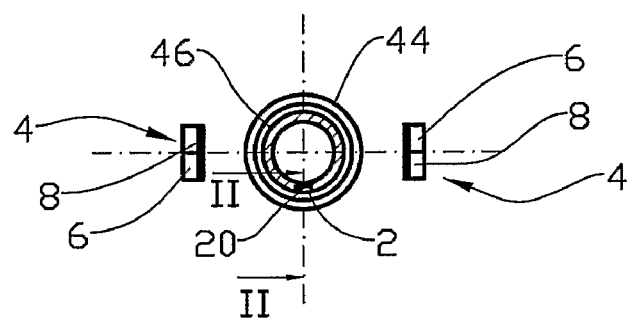
FIG. 2 shows a section I-I of FIG. 1.

In the drawings the reference numeral 1 denotes an antenna distantly located relative to the reading position of an electronic ID tag 2. In this preferred embodiment this distant antenna 1 is provided with two partial antennas 4, each comprising a transmitting antenna 6 and a receiving antenna 8.

The partial antennas 4 are distributed about the expected reading position of the electronic ID tag 2 and are attached to a suitable body, not shown.

The distant antenna 1 is connected to necessary amplifiers and data processing apparatuses, not shown.

Figure 3:
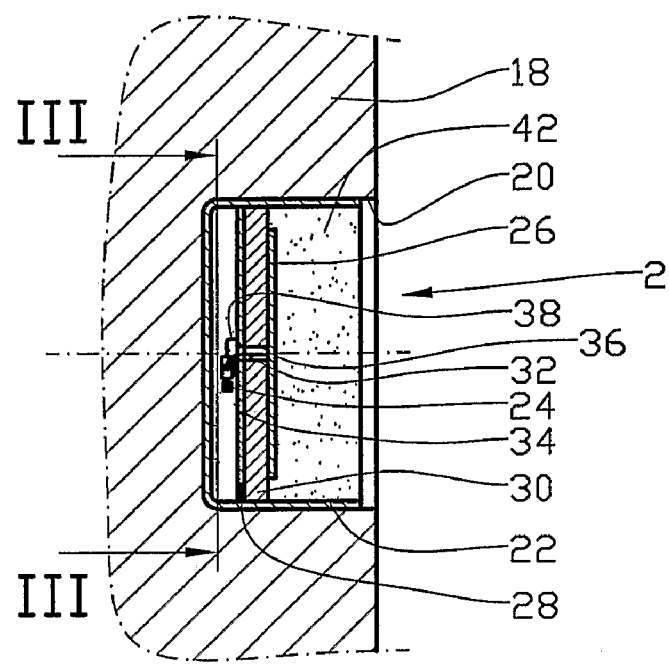
FIG. 3 shows, on a larger scale, a section II-II of the electronic ID tag of FIG. 2.
Figure 4:
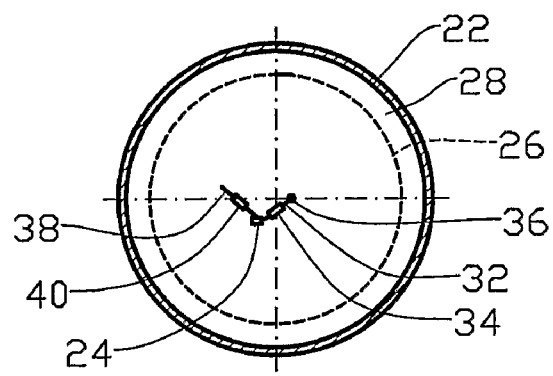
FIG. 4 shows, on a larger scale, a section III-III of FIG. 3 of the electronic ID tag.

In a pipe string, or a casing 16, including pipes or casings 18 (bodies) screwed together, each of the pipes 18 is provided with a tag recess 20, in which the electronic ID tag 2 is disposed, see FIG. 3.

The electronic ID tag 2 includes, in addition to a cup-like housing 22 which is made of an electrically conductive material, an identifiable chip 24, an adjacent antenna 26, a ground-plane plate 28 and an electrically insulating mounting plate 30.

The mounting plate 30 is placed relatively close to the bottom of the housing 22. The ground-plane plate 28 is located between the bottom of the housing 22 and the mounting plate 30 and is electrically in contact with the housing 22.

The adjacent antenna 26 is placed on the opposite side of the mounting plate 30 relative to the ground plate 28. The identifiable chip 24 is connected to the adjacent antenna 26 by means of a first conductor 32 and a first impedance-matched inductance 34, a through bore 36 in the ground plate 28 and the mounting plate 30 enabling extension to the adjacent antenna 26. A second conductor 38 connects the identifiable chip 24 to the ground plate through a second impedance-matched inductance 40. The housing 22 is filled, moreover, with a substance 42 which has a relatively low dielectric resistance.

The substance 42 is arranged to protect the electronic ID tag 2 from environmental and mechanical loads, and for drill pipes to have sufficient thickness to withstand the wear that the drill pipes are subjected to before they are to be discarded, if the ID tag is placed externally on drill pipes. For positioning on the pin or box of the drill pipe, such wear coating will not be mandatory, but only be for the mechanical protection.

The impedance-matched inductances 34 and 40 are of considerable value to avoid resistance that will attenuate the energy running from the transmitting antenna 6 to the identifiable chip 24, and from the identifiable chip 24 to the receiving antenna 8. This particular solution results in the achievement of a considerable increase in the reading distance between the chip 24 and the antennas 6 and 8.

As mentioned in the general part of the description the range in varying temperatures is improved by the use of a material for the adjacent antenna 26 which has both a very low dielectric loss and at the same time a stable dielectric constant at varying temperatures, combined with a very low thermal expansion coefficient.

As the electronic ID tag 2 together with its associated pipe 18 approaches the reading point at the distant antenna 1, energy is supplied to the identifiable chip 24 from the transmitting antenna 6 via the pipe 18, housing 22 and ground-plane plate 28 and also the adjacent antenna 26.

By means of the energy supplied, the identifiable chip 24 transmits a message including the identity of the chip 24 to the receiving antenna 8 via its adjacent antenna 26 and at least the ground-plane plate 28.

Thereby, the identity of the pipe 18 can be determined, in a manner known in itself, by means of connected data processing apparatuses, not shown.

It is advantageous for the electronic ID tag 2 to be placed in the box portions 44 of the pipes 18, so that it is protected during operation.

In FIG. 1 the electronic ID tag 2 is shown placed in the tag recess 20 of the threaded pin 46 of one pipe 18. Alternative positions are shown in the box 48 of the pipe 18 and in the end surface 50.

As for casing and other objects, it is often unnecessary to arrange a recess for the electronic ID tag 2 as the ID tag 2 can be mounted on the surface of the casing or other objects.

The invention claimed is:

1. An electronic ID tag for mounting in a body wherein at least an identity of the body is remotely readable, the electronic ID tag comprising:
    an identifiable chip wherein the identifiable chip is electrically connected to at least one adjacent antenna wherein the identifiable chip is arranged to receive energy via the adjacent antenna wherein the identifiable chip is arranged to transmit a signal to a distant antenna by means of the energy via the adjacent antenna wherein the signal includes the identity of the body wherein impedance-matched inductances are arranged between the adjacent antenna and the identifiable chip and between the identifiable chip and a ground-plane plate.

2. The electronic ID tag of claim 1 wherein the identifiable chip and the adjacent antenna are encapsulated in a housing by a casting substance wherein a dielectric constant of the casting substance is less than 5 times a dielectric constant of air.

3. The electronic ID tag of claim 1 wherein the energy is supplied to the identifiable chip by the distant antenna.

4. The electronic ID tag of claim 1 wherein the identifiable chip is electrically connected to the body.

5. The electronic ID tag of claim 2 wherein the housing is electrically conductive wherein the housing is arranged to be attached in a tag recess of the body.

6. The electronic ID tag of claim 1 wherein the electronic ID tag is placed in a pin of the body wherein the pin protects the electronic ID tag against mechanical wear.

* * * * *